Dec. 28, 1937.　　　W. J. MAYER　　　2,103,990
VEHICLE VENTILATING SYSTEM
Filed July 5, 1934　　　2 Sheets-Sheet 1
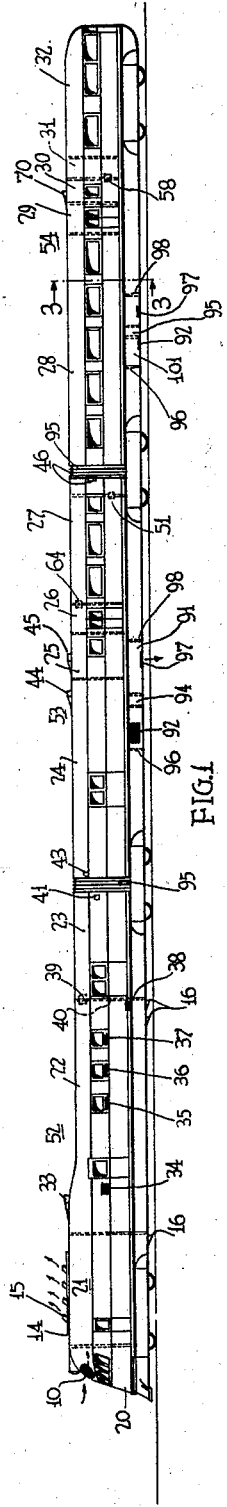
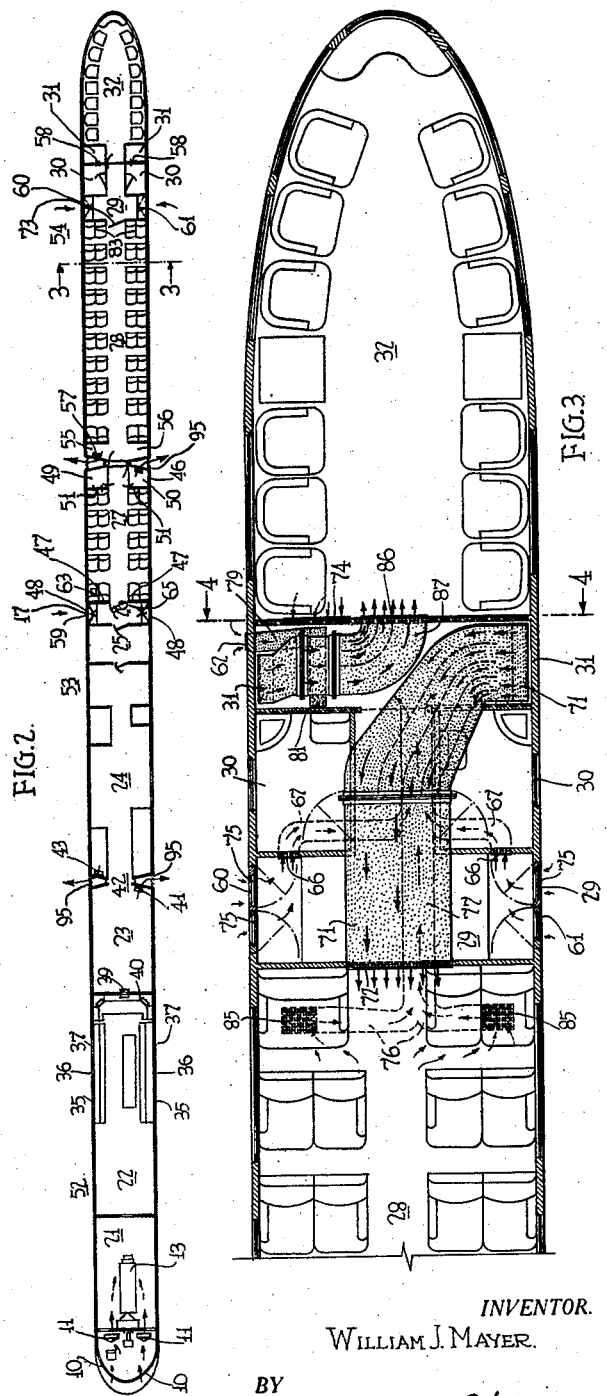
INVENTOR.
WILLIAM J. MAYER.
BY
John P. Tarbox
ATTORNEY.

Dec. 28, 1937.  W. J. MAYER  2,103,990
VEHICLE VENTILATING SYSTEM
Filed July 5, 1934  2 Sheets-Sheet 2
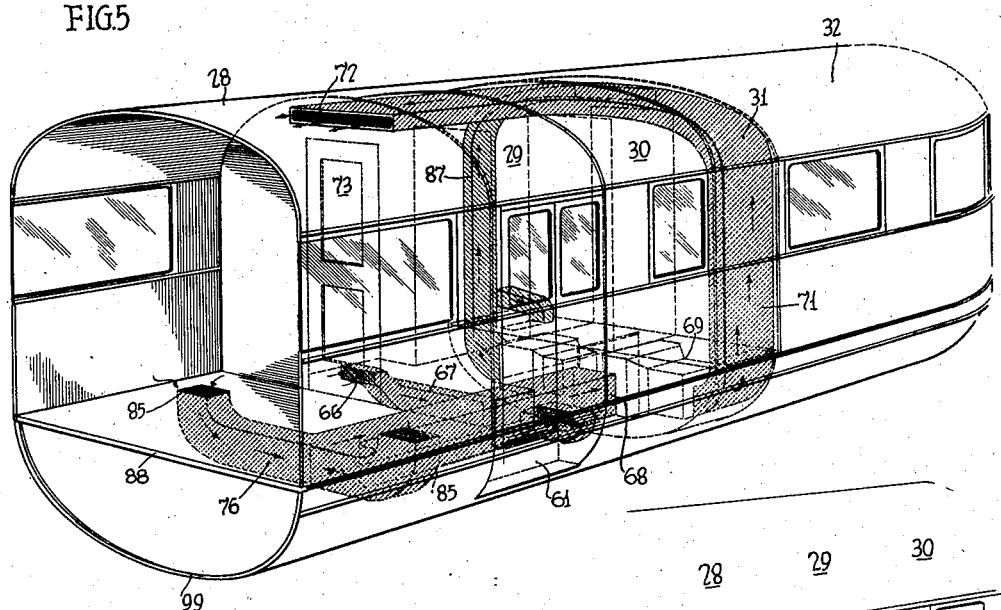
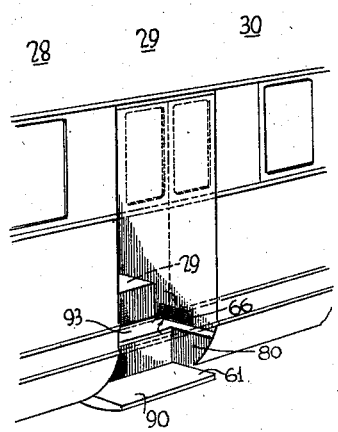
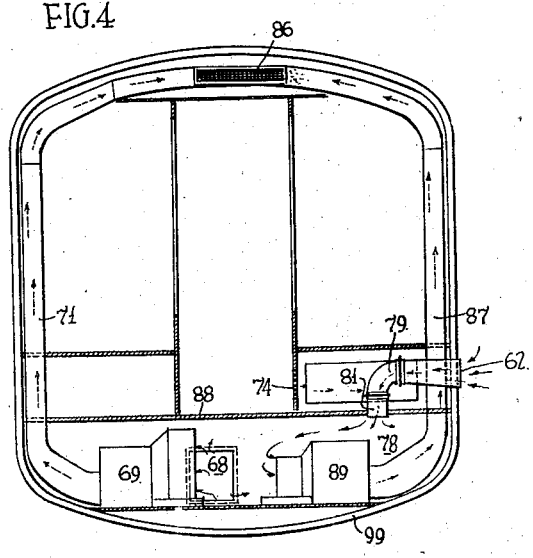
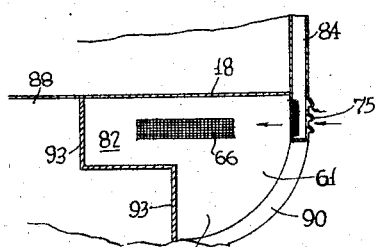
INVENTOR.
WILLIAM J. MAYER.
BY John P. Tarbox
ATTORNEY.

Patented Dec. 28, 1937

2,103,990

UNITED STATES PATENT OFFICE 2,103,990

VEHICLE VENTILATING SYSTEM

William J. Mayer, Glenside, Pa., assignor to Edward G. Budd Manufacturing Company, Philadelphia, Pa., a corporation of Pennsylvania Application July 5, 1934, Serial No. 733,809

4 Claims. (Cl. 98—13)

This invention relates to self-propelled vehicles and more particularly to air conditioning and ventilating systems for such vehicles. Among the objects of the invention are the obtaining of conditioned air in the vehicle, in both summer and winter seasons, the equitable addition of fresh air and the proportioning of the same to the return air from the compartments of the vehicle, a proper arrangement of the system with respect to the body of the vehicle, the elimination of harmful materials from the air, etc.

Fig. 1 is a side elevation of a self-propelled type vehicle showing a large number of the intake and exhaust openings for the air conditioning system of the train.

Fig. 2 is a plan view of the train of Fig. 1.

Fig. 3 is an enlarged plan to the rear of the line 3—3 of Fig. 1.

Fig. 4 is a transverse cross section along the line 4—4 of Fig. 3.

Fig. 5 is a partial perspective of the phantom type showing the portion of the vehicle similar to the portion shown in the plan view of Fig. 3.

Fig. 6 is a partial perspective of one of the door openings illustrating the air intake.

Fig. 7 is a further partial view of the intake details.

Self-propelled vehicles for operation with diversified rail transportation obviously incorporate a multiplicity of compartments for one purpose or another. In the structure illustrated the embodiment comprehends such an arrangement having the following main compartments with additional smaller compartments: the cab or engine control room 20, the motor or engine compartment 21, and utility compartments 22, 23 and 24 which may be used for various purposes such, for example, as baggage, freight, express or mail compartments, etc. any one of which uses may require particular interior equipment, the compartment 25 providing a buffet and entrance vestibules 26 and 29, passenger compartments 27, 28 and 32, and smaller compartments 30 and 31. Each and all of the compartments are either directly or indirectly in communication with the outside atmosphere and the air conditioning equipments appertaining to the particular compartment unit.

To attain a sufficient cooling of the motive power means of the train, duplicate air intake openings 10 are positioned at either side of the forward end of the vehicle allowing the passage of the air directly into the train through air ducts in the upper part of the vehicle and through fans 11 into the motor compartment 12 passing about the source of motor power 13 and exhausting from the compartment into the slip stream about the vehicle from a substantially rectangular opening 14 in the top of the train. The roof construction adjacent the opening 14 is such as to prevent the ingress of rain, snow, etc., into the motor compartment and is so arranged to carry off such foreign matter. Centrally of this opening and co-extensive to its length are positioned a plurality of individual exhaust openings 15 one for each cylinder. The air flow is thus directly into the train, through the motor compartment 21 and outward into the slip stream.

Cooling and ventilation of the storage compartments which are beneath the floor of the train and interiorly of the vehicle side walls and bottom or belly is basically accomplished by a plurality of streamlined openings 16. Ventilation of compartment 22 is preferably independent of the compartment forward of the same and has exhaust openings into the air slip stream at various points. An opening 33 exhausts from the top of the compartment and there are a plurality of openings at each side of the same which may be adjusted at will at the points 34, 35, 36, 37 and 38 to regulate the air pressures inside and outside of the train as well as to create a supply of fresh air. The compartment 22 is additionally connected by pressure equalizing means 39 positioned centrally and near the top of the wall 40 between the two compartments. This means may include filters of suitable sort and fans to create a forced draft or air flow one way or the other, if necessary. The compartment 23 further communicates in the air conditioning scheme by an opening 41 with the outside atmosphere and a passageway 42 which may or may not communicate with the next compartment 24, depending upon the condition of the door openings therebetween. However, the compartment 24 is likewise in communication with the outside atmosphere through an opening 43. The openings 41 and 43 may each have fans in addition to filter means and the compartment is additionally in communication with the outside atmosphere by a plurality of streamlined openings 44. The air exhaust openings at 41, 43, 46, 57, etc., open into the articulated areas of the train and are each concealed within the confines of the flexible wall sections 95 completing the streamline contours of the car units through the articulated area.

The compartments 25, 26 and 27 are in communication with the outside air by plural openings 45 and an opening 46 and are intercommunicating, as far as the air system is concerned, by a plurality of louvres at points 47 connecting the compartments 26 and 27, the compartments 25 and 26 being intercommunicating over the counter of the buffet between 25 and 26. Air flow from 27 through the louvres 47 through compartment 26 to 25 are exhausted to the atmosphere through one of the openings 45 which additionally carries off any smoke or fumes from the buffet. One of the door openings 17 of the compartment 26 additionally provides the air intake for the air conditioning system of this unit of the train, which opening is in communication with the compartment 26 only at periods when the train is at standstill and the doors 48 are open. At other times the air intake through the doors 48 through the step well is normally formed a closed compartment by the movable floor section 18 which effectually maintains the fresh air and car air through separate conduit systems. At the rear of the car unit are small compartments 49 and 50 which may serve as lockers for the train crew or provide baggage room for hand luggage such as suitcases or handbags, or even be utilized as suitable washrooms. The compartments 49 and 50 can be in communication with the compartment 27 by grills and air filters at the points 51.

The train unit system shown is of the articulated type comprising three units 52, 53 and 54, the latter of which includes about nine compartments and utilizes air conditioning equipment and preferably separate conditioning units for each main passenger compartment. The forward compartment 28 is in direct communication with the compartments 55 and 56, the former of which is in communication with the outside atmosphere through the grille means 57 opening in the articulated area and shielded from weather conditions as are similarly the openings at 41, 43 and 46 of the car units 52 and 53. Compartments 27 and 28 are normally separate compartments as found in the usual car construction, although when the doors between these two compartments are open a communication of conditioned air therebetween will occur. The compartments 30 at either side of the car communicate with compartments 31 by grills 58 approximately one quarter of the ceiling distance above the floor. As compartments 31 and 32 are normally in communication, the circulation of air can go from the latter to the former. Further equalization of pressures inside and outside the car and circulation of the ventilating medium may be obtained through streamlined members 70 at either side of the car in communication with the compartments 30. The main fresh air intakes for the passenger compartments come through the doors and step wells at points 59, 60 and 61 and additionally through the intake opening 62 on the side wall of the car substantially in the area of compartment 31.

The conditioning system of the car compartments comprises essentially a return air duct from the compartment, a fresh air duct from the outside, adding approximately 15% of fresh air to the air return to the conditioning units and a system of air ducts carrying the conditioned air from the conditioning apparatus to grill openings adjacent the ceilings of the transversely extending walls at the ends of the various compartments. For compartment 27 this is accomplished by a fresh air intake 59 through the step well at one side of the compartment 26 and a return air grill at the point 63 at the forward end of the car. Two intakes communicating with a duct passing to the rear portion of this car at which point is located the conditioning apparatus, and conditioned air duct from this apparatus forward of the car to the grill opening 64 above the door 65, in this unit the circulation being from point 63 to the conditioning unit and thence to the opening 64, a percentage of air leaving the car through the compartment 50 by way of the elements 51 and 46, and further, less of air through the grills 47 at either side of the car aisle which passes into the compartments 25 and 26 outwardly thereof through openings 45. It is thus seen that the loss of air from points 45 and 46 is compensated for by the intake of fresh air through the step well 59 and a continuous circulation of conditioned air is maintained. This system of circulation is likewise followed in the car unit 54 by a conditioning apparatus for compartments 28 and 32, the circulating system in this instance being fresh air from the points 60 and 61.

The air conditioning for compartment 28 which is the main passenger compartment, is controlled primarily by fresh air inlets at points 60 and 61 through the step wells of the doors. Fresh air from the outside is drawn in through louvres and grills containing filters, etc., in the lower portions of the doors as at 75, these air intake openings being substantially similar to the intake opening at the point 59 for the air conditioning system of compartment 27. These are fresh air inlets and add about 15% of fresh air to the air conditioning circulating system of the car, the remainder being return air from the car compartment. This return air from the car compartment comes from compartment 28 through grills 85, the grills 85 connecting with air ducts 76 carrying the return air into the duct 77. The fresh air from the step wells 60 and 61 is conveyed through a grill 66 at right angles to the intake air flow, thus effectually throwing out any foreign material such as snow, ice, dirt, etc., which is also additionally eliminated by the louvres and grills in the doors per se, the grills 66 connecting with ducts 67, the ducts 67 and 77 being common at the point 68 where it enters the conditioning units 69. The conditioning units 69 send the conditioned air through a duct 71 which exhausts into the car compartment 28 through the grills 72. It is thus seen that a continuous circulation occurs between fresh air, return air and conditioned air, the system being a continuous system, the intake air openings 85 being below the seats 83 and the grills 72 being above the door 73. Each air conditioning unit is in a hermetically sealed compartment, the compartment serving as a reservoir of return and fresh air and the unit receiving from the compartment the air supply which is conditioned and then exhausted from the conditioning unit into a duct which carries the conditioned air to the car compartment. The car unit 28 is also in communication with the outside air so that equalized pressures are maintained inside and outside the car.

The conditioning units for compartment 32 has a fresh air intake at point 62 in the side of the car and return air grills at 74, the intake 62 communicating with a fresh air duct 79 and the grills 74 communicating with a return air duct 81, both ducts feeding into the conditioning compartment 78, the return air and fresh air being mixed in this compartment 78 and fed into the conditioning unit 89, which in turn by the duct 87, transmits the conditioned air through a grill 86 centrally above the entrance of the compartment.

In Figure 7 the step well is shown in somewhat greater detail, this figure representing any one of the intakes through the step wells and having a movable floor section 18 which completes the floor surface 88 when the car doors 84 are closed and the car is in motion, the bottom step 90 when closed, serving to complete the compartment enclosure. This small compartment 82 is defined by the side walls 88 adjacent the steps 93. The air enters through the grills and louvres at 75 in the direction of the arrow, makes a right angle turn into the grill 66, due to the fact that 18, 84, 88, 93 and 88 form a box having an intake at 75 and an exhaust at 66. This effectually eliminates any rain, snow, sleet, etc. from the air in winter time and dust and dirt in other seasons of the year. It further avoids intake openings in the slip stream of the car and has other features of merit. The changed direction of the air effects elimination of some foreign matter by centrifugal forces. The direction through the louvres aids in this and the grills and filters remove other matter not removed due to the centrifugal forces. The ice and snow do not gather in the step wells because of the warm condition at this point in the winter time.

To facilitate the heat transfer of the refrigerating units, additional cooling compartments are positioned beneath the car floors 88 and interiorly of the curved outer surface walls 99, two of which are indicated at points 91 and 101. Each of these compartments has an intake opening 92 and an exhaust opening 97 with suitable heat transfer coils centrally at 94 and 95, respectively. These elements of the conditioning system operate by an air intake at 92 into the closed compartments defined by the walls 96 and 88 passing through the coils at 94 and 95 and exhausting to the atmosphere at points 97.

While by way of illustration and example I have described my invention in connection with a preferred embodiment thereof as to structure, and the preferred manner of practicing it, it will be obvious to those skilled in the art, after understanding the foregoing specification, that various changes and modifications may be made without departing from the spirit or scope of the invention and I aim in the appended claims to cover all such modifications and changes.

What I claim is:

1. An air intake for streamline trains comprising, in combination, a step well, a movable floor section forming a top to the step well, car doors forming closed sides of the step well and a pivoted step completing a closed compartment of the step well and means providing a fresh air intake into said compartment and means at right angles to said last named means transferring the air into a conditioning duct system of the vehicle.

2. An air intake for vehicles comprising in combination, a step wall which is constituted a substantially closed compartment when the vehicle door is closed and the platform flooring is in place, means providing a fresh air intake into said compartment and means at an angle thereto for transferring the air into a conditioning duct system of the vehicle.

3. An air intake for vehicles comprising in combination, a step well, means to close the well and constitute it a compartment when the vehicle is closed, together with air entrance and air exit means connected with said well, and an air conditioning duct system on the vehicle communicating with the exit means.

4. In a vehicle having an air conditioning system, a step well, vehicle doors closing said step well and constituting it a closed off compartment when the vehicle is closed, such compartment constituting a part of a fresh air entrance duct for the system, said vehicle doors containing the fresh air opening to said step well compartment.

WILLIAM J. MAYER.